(12) United States Patent
Nicholls

(10) Patent No.: US 12,202,362 B2
(45) Date of Patent: Jan. 21, 2025

(54) ELECTRICAL POWER CIRCUIT FOR CHARGING AN ELECTRIC VEHICLE AND HAVING A DC/DC CONVERTER FOR SUPPLYING ELECTRICITY TO AUXILIARY DEVICES

(71) Applicant: JAGUAR LAND ROVER LIMITED, Coventry (GB)

(72) Inventor: Stephen Nicholls, Witney (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 18/023,725

(22) PCT Filed: Aug. 27, 2021

(86) PCT No.: PCT/EP2021/073740
§ 371 (c)(1),
(2) Date: Feb. 28, 2023

(87) PCT Pub. No.: WO2022/043495
PCT Pub. Date: Mar. 3, 2022

(65) Prior Publication Data
US 2023/0278440 A1 Sep. 7, 2023

(30) Foreign Application Priority Data
Aug. 28, 2020 (GB) ..................................... 2013551

(51) Int. Cl.
*B60L 53/22* (2019.01)
*B60L 1/00* (2006.01)
(Continued)

(52) U.S. Cl.
CPC ................. *B60L 53/22* (2019.02); *B60L 1/00* (2013.01); *B60L 50/60* (2019.02); *B60L 58/19* (2019.02);
(Continued)

(58) Field of Classification Search
CPC .. B60L 52/22; B60L 1/00; B60L 50/60; B60L 58/19; B60L 2210/30; B60L 2240/547
(Continued)

(56) References Cited

U.S. PATENT DOCUMENTS

| 2018/0115246 A1* | 4/2018 | Azrai ........................ G06F 1/26 |
| 2019/0097436 A1* | 3/2019 | Ing ......................... B60L 3/0007 |
| 2019/0165713 A1 | 5/2019 | Namuduri et al. |
| 2020/0055412 A1 | 2/2020 | Krieg et al. |
| 2022/0231537 A1* | 7/2022 | Hirota ....................... H02J 7/16 |

FOREIGN PATENT DOCUMENTS

| DE | 102018129819 A1 | 5/2019 |
| JP | 2019129558 A | 8/2019 |

(Continued)

OTHER PUBLICATIONS

International Search Report and Written Opinion for Application No. PCT/EP2021/073740, dated Dec. 14, 2021, 13 pages.
(Continued)

*Primary Examiner* — Michael R. Fin
(74) *Attorney, Agent, or Firm* — Reising Ethington P.C.

(57) ABSTRACT

An electrical power circuit (100) is disclosed, comprising a charging input (102) for receiving electrical energy at a first or second voltage for charging a traction battery (106) of the vehicle; a battery connection terminal (104) for electrically connecting to the traction battery to supply electrical energy from the charging input for charging the traction battery at the first or second voltage and to receive electrical energy from the traction battery to power one or more traction motors (108) of the vehicle at the second voltage; and a DCDC converter (112) coupled to the charging input and to an output for connecting the DCDC converter to an electrical bus for providing power to one or more electrical units at an output voltage, the DCDC converter configured to receive electrical energy from the charging input, and to
(Continued)

provide electrical energy at the output voltage whilst the traction battery is charged at the first voltage.

18 Claims, 5 Drawing Sheets

(51) Int. Cl.
*B60L 50/60* (2019.01)
*B60L 58/19* (2019.01)

(52) U.S. Cl.
CPC ....... *B60L 2210/10* (2013.01); *B60L 2210/30* (2013.01); *B60L 2240/547* (2013.01)

(58) Field of Classification Search
USPC ........................................................ 307/10.1
See application file for complete search history.

(56) References Cited

FOREIGN PATENT DOCUMENTS

| | | |
|---|---|---|
| JP | 2020018078 A | 1/2020 |
| WO | 2020230202 A1 | 11/2021 |

OTHER PUBLICATIONS

Combined Search and Examination Report for Application No. GB2013551.3, dated Apr. 15, 2021, 7 pages.
English summary of Japanese Office Action corresponding to application 2023-514154, dated Mar. 26, 2024, 15 pages.
Great Britain Examination Report corresponding to application GB2013551.3, dated Oct. 29, 2024, 6 pages.

* cited by examiner

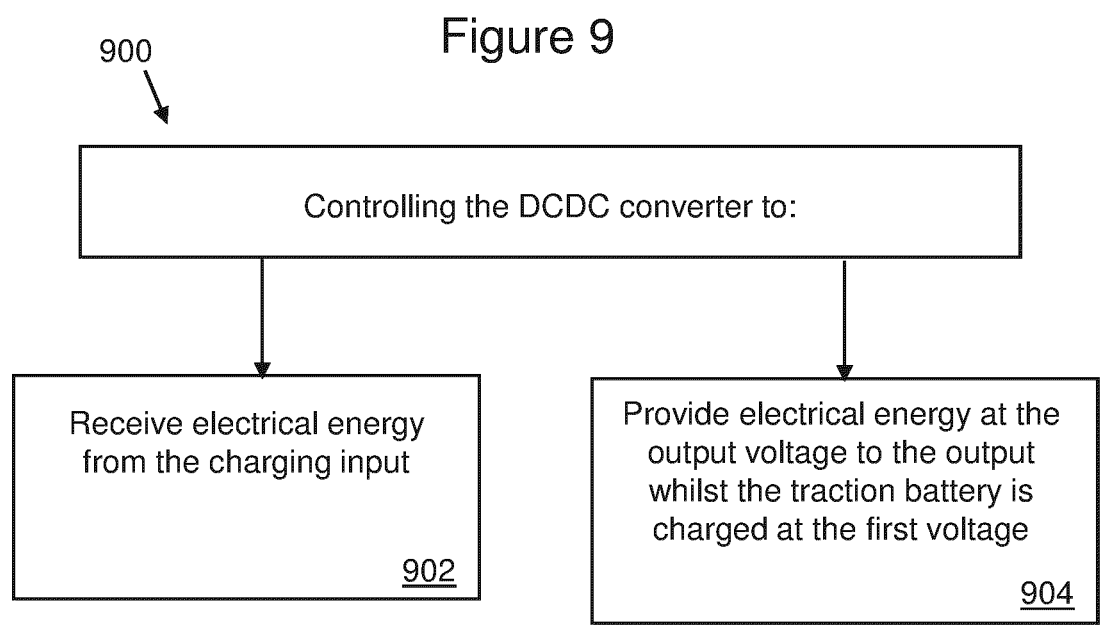

ELECTRICAL POWER CIRCUIT FOR CHARGING AN ELECTRIC VEHICLE AND HAVING A DC/DC CONVERTER FOR SUPPLYING ELECTRICITY TO AUXILIARY DEVICES

TECHNICAL FIELD

The present disclosure relates to an electrical power circuit for a vehicle. Aspects relate to an electrical power circuit, to a battery assembly, to a control system, to a system, to a vehicle, to a method, and to computer software.

BACKGROUND

Electric vehicles and hybrid electric vehicles comprise traction motors, and traction batteries for supplying electrical energy to the traction motors. Some traction batteries can be recharged with electrical energy from outside the vehicle, such as electrical energy from an electrical grid.

Until recently battery electric (passenger) vehicles (BEV) operated at a nominal voltage of 400V. There is an ongoing need to increase the speed of BEV charging, which requires higher charging power. As charging power increases, then the charging current increases. Associated losses (such as heat loss) also increase, since the heating of an electrical element e.g. a cable, is dependent on the current (power is equal to the current squared multiplied by the resistance, $P=I^2R$). Doubling the operating voltage would halve the current for the same power transfer ($P=IV$). However, existing vehicle components/electrical systems operate at 400V, and it is undesirable to use completely new and different components/electrical systems to handle a different voltage and maintain the power output. Further, a reason to change the operational voltage would be for charging the battery, and not, for example, during driving the vehicle (which is likely to be the majority use of the time spent operating by the vehicle circuitry).

Many BEV charging facilities operate at 400V. It would, however, be desirable to be able to use 800V charging since charging may take place faster than at 400V. However, if a vehicle's electrical components/circuitry are designed to operate at 800V, then it would not also be possible to use most (400V) charging stations. If a battery pack for a BEV and the high voltage (e.g. over around 350V) system of a vehicle is designed to operate at a voltage of 400V it represents a significant challenge to charge such a system at 800V. Conversely, a similar problem arises if the system is designed for 800V operation, because charging at 400V would not be possible.

By using a combination of configurable control gear within the battery pack of the BEV, the operational voltage of the battery pack may be adjusted between, e.g. 400V and 800V. This may be achieved, for example, by placing two 400V battery packs in with parallel or series, and switching between those configurations using a switching gear.

A problem may occur when, during charging of the battery pack at 800V, it is desired to use the vehicle auxiliary units, such as auxiliary units used to manage the thermal condition of the battery pack (e.g. chiller system, heating system). These vehicle auxiliary units may require a 400V electrical supply, not the 800V supply used to charge the battery pack. Further, it is desirable for the vehicle electrical circuitry and components to be able to accommodate different configuration options for the HV architecture.

Further, DC-DC and OBC (on-board charger) circuitry in electric vehicles are generally of fixed voltage output. However, in electric vehicle designs, there may be multiple voltage outputs depending on the systems inside the vehicle. Examples include: drive inverters which operate at 400V, and advanced driver assistance systems (ADAS) at 12V/48V, while the HV battery may charge at 800V. So it is desirable for the vehicle circuitry and components to be able to provide different output voltages, such as 400V or 12V, in particular while the battery pack of the vehicle is charging at a different voltage again, e.g. 800V. Using multiple DC-DC converters inside the vehicle is undesirable, because it contributes to an increasing complexity, and cost, of the electrical architecture of the vehicle.

It is an aim of examples disclosed herein to address one or more of the disadvantages associated with the prior art.

SUMMARY OF THE INVENTION

A possible solution to the above-mentioned problems is one system that can provide a stable output to a vehicle's auxiliary circuits (for example at high voltage e.g. 400V and/or low voltage e.g. 12V) regardless of the charging voltage (e.g. 400V or 800V). Such a system may, for example, support both LV (low voltage) and HV (high voltage) systems simultaneously.

This may provide a flexible and re-configurable electrical system, which may be initially designed and delivered, but can then be used in different applications and in various configurations of the vehicle. Improving the flexibility of the electrical circuitry to provide different output voltages may be desirable, in particular in the automotive industry, where it is desirable to use common designs for electrical circuitry. This may allow for lower manufacturing and design costs and labour, and still provide a flexibility in electrical configuration for application for different vehicles, i.e. for different customers and markets. Such a system may, for example, supporting both 800V and 400V traction systems.

Aspects disclosed herein provide an electrical power circuit, to a battery assembly, to a control system, to a system, to a vehicle, to a method, and to computer software.

According to an aspect of the present invention there is provided an electrical power circuit for a vehicle, comprising: a charging input for receiving electrical energy at a voltage equal to a first voltage or a second voltage for charging a traction battery of the vehicle; a battery connection terminal for electrically connecting to the traction battery to supply electrical energy from the charging input for charging the traction battery at the first voltage or the second voltage and to receive electrical energy from the traction battery to power one or more traction motors of the vehicle at the second voltage; and a DCDC converter coupled to the charging input and to an output, the output for electrically connecting the DCDC converter to an electrical bus of the vehicle for providing electrical power to one or more electrical units of the vehicle at an output voltage. The DCDC converter is configured to receive electrical energy from the charging input, and to provide electrical energy at the output voltage to the output whilst the traction battery is charged at the first voltage.

In some examples, the first voltage may be higher than the second voltage. The first voltage and second voltage may be non-overlapping ranges. The output voltage may be lower than the first voltage and the second voltage.

The first voltage may comprise a nominal voltage in the range 600V to 1000V; the second voltage may comprise a nominal voltage in the range 300V to 500V; and the output voltage may comprise a nominal voltage in the range 12V to 48V.

The output voltage may be the second voltage in some examples.

For example, the charging input may provide a higher charging voltage of e.g. 800V to the traction battery (or a different voltage if available e.g. 400V), while providing a lower voltage of e.g. 400V or 12V to the output/electrical bus, for provision to auxiliary units such as heaters or coolers to operate at 400V and/or for provision to auxiliary units such as in-vehicle device charge points at 12V, whether the battery is charging at 400V or 800V. Thus the auxiliary units may operate at their preferred voltage while the battery is charged at the voltage available, which may be higher than the voltage required for the auxiliary units. This enables the battery operating conditions be maintained so as to ensure operating efficiency and/or protection against battery degradation.

The DCDC converter may comprise a first DCDC converter module and a second DCDC converter module. The first DCDC converter module may be coupled to the charging input and to a first output, the first output for electrically connecting the first DCDC converter module to a first electrical bus of the vehicle for providing electrical power to one or more first electrical units of the vehicle at a first output voltage, and the second DCDC converter module may be coupled to the charging input and to a second output, the second output for electrically connecting the second DCDC converter module to a second electrical bus of the vehicle for providing electrical power to one or more second electrical units of the vehicle at a second output voltage. The DCDC converter may be configured to: receive electrical energy from the charging input; provide electrical energy at the first output voltage to the first output; and provide electrical energy at the second output voltage to the second output whilst the traction battery is charged at the first voltage or the second voltage.

The electrical power circuit of any preceding claim may comprise an AC charging input. The DCDC converter may be configured to receive electrical energy from the AC charging input and provide electrical energy to the battery connection terminal at the first voltage for charging the traction battery.

The output may be for electrically connecting the DCDC converter to an electrical bus of the vehicle for providing electrical power to one or more auxiliary electrical units of the vehicle at the output voltage whilst the traction battery is being charged by AC charging.

The electrical units may comprise one or more of: a heater; a chiller; an air conditioning compressor; a power-assisted steering system; an active roll control pump; a suspension compressor; and a heated windscreen. The electrical units may also be any other auxiliary device that may be converted from operating at 12V to operating at 400V. This could include a power inverter for providing alternating current (AC) for supplying domestic appliances.

The electrical power circuit may comprise an onboard charger coupled to the DCDC converter, the onboard charger configured to receive AC current and to provide a DC current to the DCDC converter.

In some examples the onboard charger may operate independently, such that in some examples, there may be provided an electrical power circuit for a vehicle, the onboard charger comprising: an AC charging input for receiving electrical energy for charging a traction battery of the vehicle; a battery connection terminal for electrically connecting to the traction battery to supply electrical energy from the AC charging input for charging the traction battery; and an ACDC converter coupled to the AC charging input and to the battery connection terminal. The ACDC converter may be configured to receive electrical energy from the AC charging input and provide electrical energy to the battery connection terminal at a first voltage in a first voltage range or at a second voltage in a second voltage range, wherein the first and second voltage ranges are non-overlapping voltage ranges. The output of the OBC may supply a HV bus which is connected to battery connection terminals. Thus, in some examples, an external battery pack 106 may be configured to receive electrical power at the same time as the operation of the DCDC converter(s) of the electrical power circuit providing electrical energy.

In a further aspect there is provided a battery assembly comprising a traction battery and the electrical power circuit of any preceding claim, wherein the traction battery comprises a battery input/output, and wherein the battery input/output is electrically connected to the battery connection terminal.

The traction battery may comprise a first plurality of cells, a second plurality of cells, and a battery control circuit to selectively interconnect the first and second plurality of cells in series to provide a first battery voltage at the battery output in a first mode of operation and to selectively interconnect the first and second plurality of cells in parallel to provide a second battery voltage at the battery output in a second mode of operation.

In a further aspect there is provided a control system for controlling an electrical power circuit of a vehicle, the control system comprising one or more controllers, wherein the control system is configured to, in an electrical power circuit comprising: a charging input for receiving electrical energy at a voltage equal to a first voltage or a second voltage for charging a traction battery of the vehicle; and a battery connection terminal for electrically connecting to the traction battery to supply electrical energy from the charging input for charging the traction battery at the first voltage or the second voltage and to receive electrical energy from the traction battery to power one or more traction motors of the vehicle at the second voltage; and a DCDC converter coupled to the charging input and to an output, the output for electrically connecting the DCDC converter to an electrical bus of the vehicle for providing electrical power to one or more electrical units of the vehicle at an output voltage; control the DCDC converter, to:

receive electrical energy from the charging input, and
provide electrical energy at the output voltage to the output whilst the traction battery is charged at the first voltage.

The one or more controllers may collectively comprise: at least one electronic processor having an electrical input for receiving information from one or more sensors and/or one or more external controllers; and at least one electronic memory device electrically coupled to the at least one electronic processor and having instructions stored therein; and the at least one electronic processor may be configured to access the at least one memory device and execute the instructions thereon so as to cause the control system to control the DCDC converter in dependence on the information.

The first voltage may be higher than the second voltage. The first voltage and second voltage may be non-overlapping ranges. The output voltage may be lower than the first voltage and the second voltage.

The first voltage may comprise a nominal voltage in the range 600V to 1000V. The second voltage may comprise a nominal voltage in the range 300V to 500V. The output voltage may comprise a nominal voltage in the range 12V to 48V. The output voltage may be the second voltage.

The electrical power circuit may comprise an AC charging input. The control system may be configured to control the DCDC converter to receive electrical energy from the AC charging input (e.g. via an AC-DC conversion element) and provide electrical energy to the battery connection terminal at the first voltage for charging the traction battery.

In a further aspect there is provided a system comprising a battery assembly as disclosed herein, and a control system as disclosed herein.

In a further aspect there is provided a vehicle comprising an electrical power circuit as disclosed herein, a battery assembly as disclosed herein, a control system as disclosed herein, or a system as disclosed herein.

The vehicle may comprise an electrical bus. The electrical bus may comprise a High Voltage (HV) auxiliary power bus configured to provide electrical energy to one or more auxiliary units of the vehicle at the second voltage.

In a further aspect there is provided a method of controlling an electrical power circuit for a vehicle, the electrical power circuit comprising: a charging input for receiving electrical energy at a voltage equal to a first voltage or a second voltage for charging a traction battery of the vehicle; and a battery connection terminal for electrically connecting to the traction battery to supply electrical energy from the charging input for charging the traction battery at the first voltage or the second voltage and to receive electrical energy from the traction battery to power one or more traction motors of the vehicle at the second voltage; and a DCDC converter coupled to the charging input and to an output, the output for electrically connecting the DCDC converter to an electrical bus of the vehicle for providing electrical power to one or more electrical units of the vehicle at an output voltage. The method comprising controlling the DCDC converter to: receive electrical energy from the charging input; and provide electrical energy at the output voltage to the output whilst the traction battery is charged at the first voltage.

In a further aspect there is provided computer software that, when executed, is configured to perform any method disclosed herein. Optionally the computer software is stored on a computer readable medium. Optionally the computer software is tangibly stored on a computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 9 show a method according to examples disclosed herein.

DETAILED DESCRIPTION

Examples disclosed here may provide a flexible voltage output for use in an electrical vehicle. Certain examples may support both 800V and 400V traction systems. It may be desirable that the battery of the vehicle may be charged at a different voltage to an output voltage supplied to the vehicle circuitry. for example, it may be desirable that the battery of the vehicle may be charged at either a 400V supply or an 800V supply, for example while a 400V voltage is supplied to the vehicle circuitry. For example, it may be desirable to operate a heater unit or a chiller unit of a vehicle during charging of the battery; battery charging may be available at 800V, though the heater/chiller may require a different voltage, such as 400V, to operate.

Certain examples may support both LV (low voltage) and HV (high voltage) systems simultaneously. Having the capability to accept, for example, substantially 800V (e.g. a voltage between 650V to 850V) or substantially 400V (e.g. a voltage between 270V to 470V) at the same input allows for a flexible system capable of operating with different voltage requirements. Allowing for bi directional operation (i.e. allowing the battery of the vehicle to be charged, and allowing the charged stored in the vehicle battery to be used to power the vehicle) is desirable.

Figure 1:
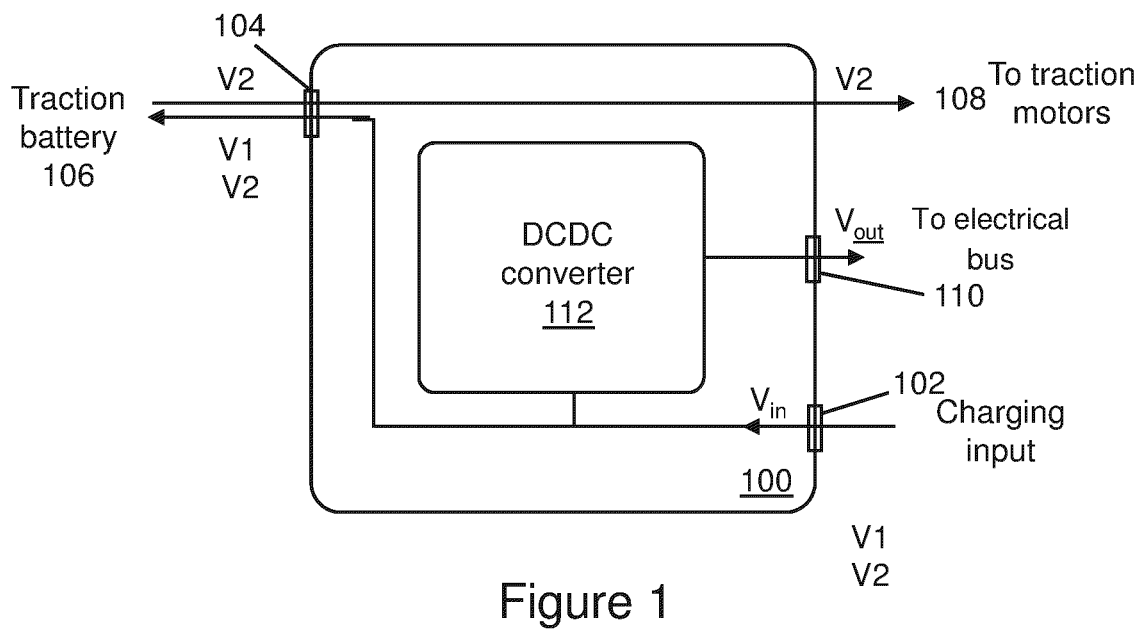
FIG. 1 shows an electrical power circuit according to examples disclosed herein.

Examples discussed herein provide circuits for use in the automotive industry, which may be advantageous so that existing systems can be used flexibly, i.e. different possible voltages can be accepted at the input for charging, and different possible voltages may be provided for use, during charging, without the need for entirely new and different electrical circuitry each designed for a particular fixed voltage input and/or output. T FIG. 1 shows an electrical power circuit 100 for a vehicle. The circuit 100 comprises a charging input 102 for receiving electrical energy. The electrical energy may be received at a voltage equal to a first voltage V1 or a second voltage V2 for charging a traction battery of the vehicle. For example, the charging input 102 may accept energy at e.g. V1=800V or V1 between 650V to 850V, or e.g. V2=400V or V2 between 270V to 470V, depending on the voltage used at the charging station supplying the electrical energy.

The circuit 100 comprises a battery connection terminal 104 for electrically connecting to the traction battery 106 of the vehicle, to supply electrical energy from the charging input 102 for charging the traction battery 106 at the first voltage V1 or the second voltage V2, and to receive electrical energy from the traction battery 106 to power one or more traction motors 108 of the vehicle at the second voltage V2. For example, electrical energy from the charging input 102 may be supplied at V1=800V or V2=400V to charge the traction battery 106, and a traction motor 108 may be powered by the traction battery 106 at V2=400V.

The circuit 100 comprises a DCDC converter 112 coupled to the charging input 102 and to an output 110. The output 110 is for electrically connecting the DCDC converter 112 to an electrical bus of the vehicle for providing electrical power to one or more electrical units of the vehicle at an output voltage. The DCDC converter 112 is configured to receive electrical energy from the charging input 102, and to provide electrical energy at the output voltage to the output 110, whilst the traction battery 106 is charged at the first voltage which may be different to the output voltage i.e. electrical energy is provided at the output 110 during charging of the traction battery 106 (that is, during electrical energy input to the circuit 100 to charge the connected battery 106).

For example, the DCDC converter 112 may receive electrical energy from the charging input 102, and provide electrical energy at the output voltage, e.g. 400V, or e.g. 12V to the output 110, whilst the traction battery 106 is charged at the first voltage of e.g. 800V. Thus it is possible to take advantage of high voltage charging at e.g. 800V, even if the vehicle auxiliary units connected via the electrical bus to the battery 106 via the circuit 100 require a different operating voltage of e.g. 400V or 12V, and operate those auxiliary units while the battery is being charged, for example, at a different voltage to the operating voltage of the auxiliary units. This may be useful, for example, if a heater is used at e.g. 400V to warm the battery while the battery is being charged at e.g. 800V.

Thus, in some examples, the first voltage (e.g. 800V) may be higher than the second voltage (e.g. 400V). In some examples, the first voltage and second voltage may be non-overlapping ranges (for example, the first voltage may be between 650V and 850V, and the second voltage may be between 270V and 470V). In some examples, the output voltage (e.g. 12V, or a low voltage range of e.g. 5V to 48V) may lower than the first voltage (e.g. 800V, or 650V and 850V) and the second voltage (e.g. 400V, or 270V to 470V).

In some examples, therefore, the first voltage may comprise a nominal voltage in the range 600V to 1000V; the second voltage may comprise a nominal voltage in the range 300V to 500V; and/or the output voltage may comprise a nominal voltage in the range 12V to 48V, for example. Units operating at an output voltage of 400V may operate at a power of 15 kW in some examples. Units operating at a low output voltage of 12V may operate at a power of 4 kW in some examples.

In some examples, the output voltage may be the second voltage. For example, the battery may be charged at either 800V or 400V first voltage, the second voltage used to power a traction motor may be 400V, and an output voltage used to e.g. power a chiller unit may also be 400V. In some examples, the output voltage may not be the second voltage. For example, the battery may be charged at either 800V or 400V first voltage, the second voltage used to power a traction motor may be 400V, and an output voltage used to e.g. power a personal device charger point may be a low voltage e.g. a voltage in the range 5V to 48V, for example 12V, 24V, 36V or 48V.

Electrical units which may be powered at the output voltage (which may or may not be the second voltage used to power the traction motor(s)) include heaters, chillers, air conditioning compressors, a power-assisted steering system, an active roll control pump, a suspension compressor, a heated windscreen, and a personal device charger point, for example.

In this example, the charging input 102 forms an external connection, for example for connection to a charge supplying station, and is connected to the DCDC converter 112. The battery connection terminal 104 forms an external connection, for example for connection to an external battery pack/traction battery 106, and is connected to the DCDC converter 112. There is also a direct connection between the charging input 102 and the battery connection terminal 104 which does not connect via the DCDC converter 112. There is also a direct connection between the battery connection terminal 104 and the connection out to one or more traction motors 108 which is not via the DCDC converter 112. The output 110 forms an external connection, for example for connection to an electrical bus of the vehicle, which in turn is for providing electrical power to one or more electrical units of the vehicle. The output 110 is connected to the DCDC converter 112.

Figure 2:
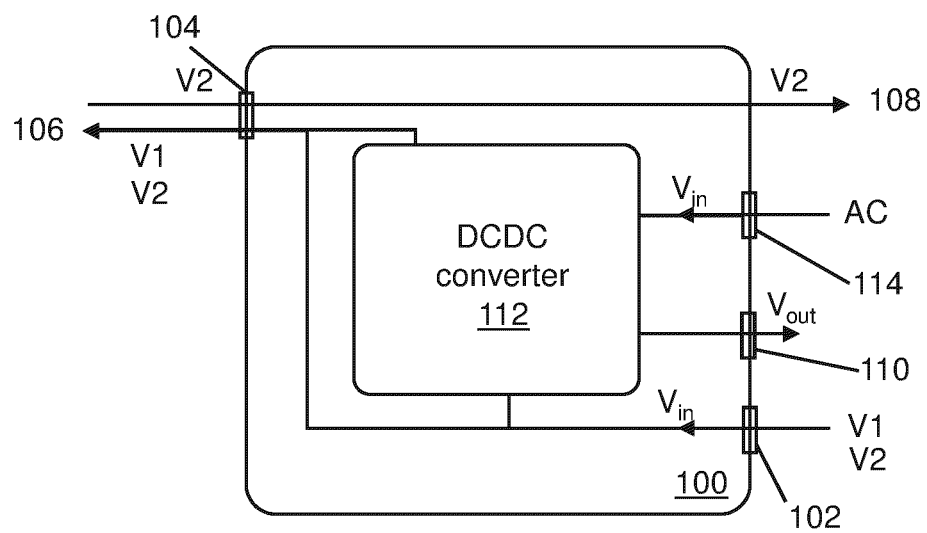
FIG. 2 shows an electrical power circuit with an AC input according to examples disclosed herein.

FIG. 2 shows an electrical power circuit 100 with an AC charging input 114. Features in common with the circuit of FIG. 1 are not discussed again in detail here. The DCDC converter 112 in this example is configured to receive electrical energy from the AC charging input 114 (e.g. via an AC-DC conversion element), and provide electrical energy to the battery connection terminal 104 at the first voltage V1 for charging the traction battery. The output 110 in such examples is for electrically connecting the DCDC converter 112 to an electrical bus of the vehicle for providing electrical power to one or more auxiliary electrical units of the vehicle at the output voltage $V_{out}$ whilst the traction battery is being charged by AC charging. In this example, the AC charging input 114 forms an external connection, for example for connection to an AC charge supply, and is connected to the DCDC converter 112.

Figure 3:
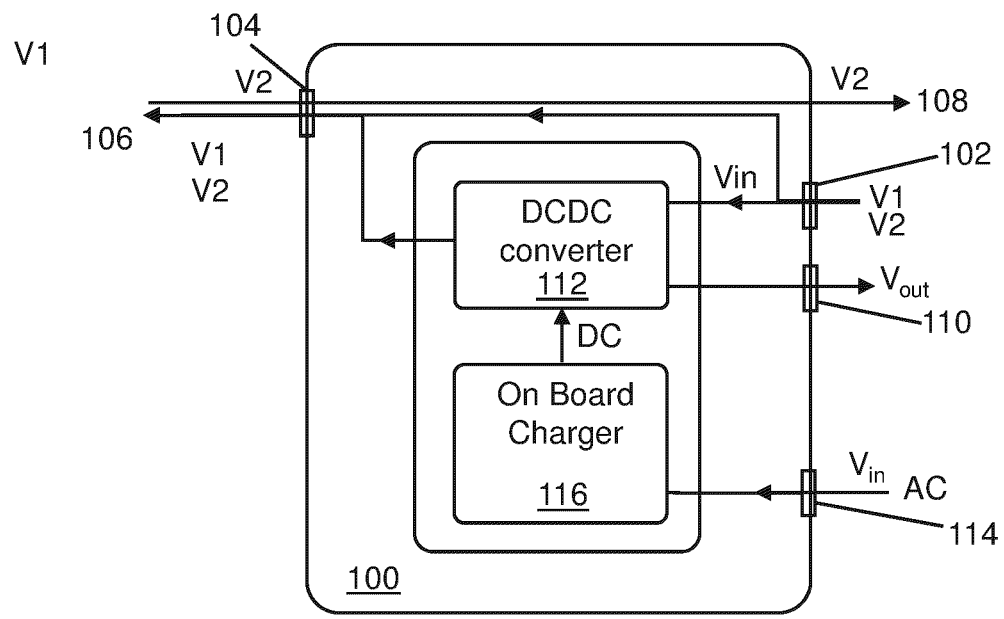
FIG. 3 shows an electrical power circuit with an On Board Charger according to examples disclosed herein.

FIG. 3 shows an electrical power circuit 100 with an onboard charger (OBC) 116. Features in common with the circuit of FIG. 1 are not discussed again in detail here. The onboard charger 116 is coupled to the DCDC converter 112. The onboard charger 116 is configured to receive AC current electrical energy at voltage Vin, at the AC charging input terminal 114, and to provide DC current electrical energy to the DCDC converter 112. In this example, the AC charging input 114 forms an external connection, for example for connection to an AC charge supply, and is connected to the OBC 116 which receives AC input power and provides DC power to the DCDC converter 112.

Figure 4:
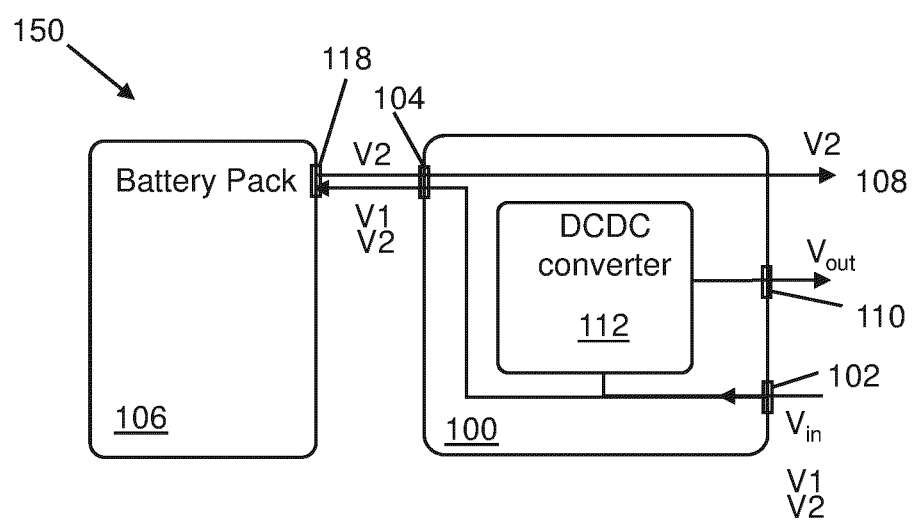
FIG. 4 shows an electrical power circuit connected to a traction battery according to examples disclosed herein.

FIG. 4 shows an electrical power circuit 100 connected to a traction battery 106. Features in common with the circuit of FIG. 1 are not discussed again in detail here. The combination of battery pack/traction battery 106 and circuit 100 may be termed a "battery assembly" 150. The traction battery 106 comprises a battery input/output 118 which is electrically connected to the battery connection terminal 104 and allows for connection of the battery pack 106 to the power circuit 100. The traction battery 106 in this example may comprise a first plurality of cells, a second plurality of cells, and a battery control circuit to selectively interconnect the first and second plurality of cells in series to provide a first battery voltage at the battery output in a first mode of operation and to selectively interconnect the first and second plurality of cells in parallel to provide a second battery voltage at the battery output in a second mode of operation. For example, the first battery voltage may be 800V and the second battery voltage may be 400V.

Figure 5:
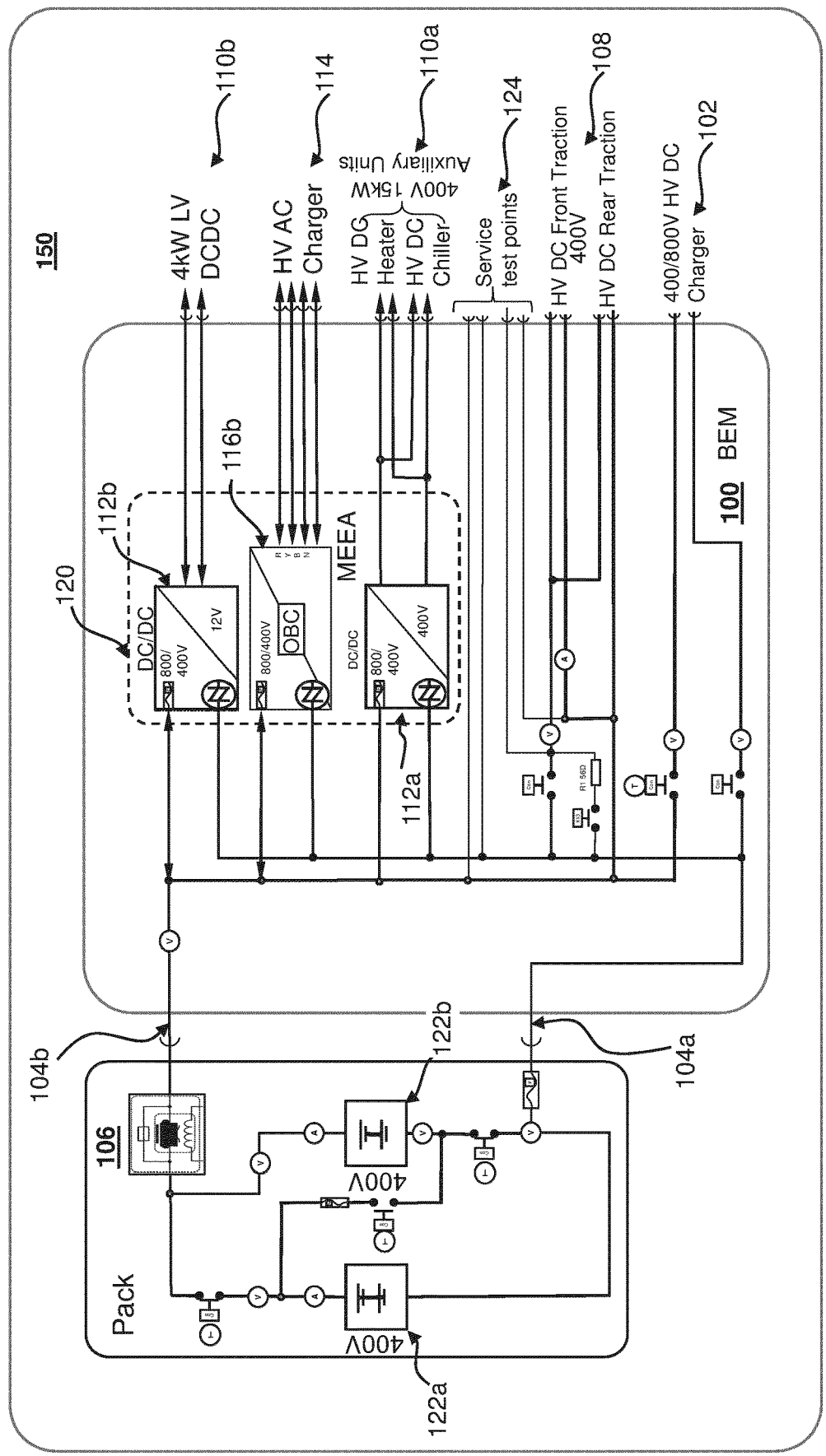
FIG. 5 shows an electrical power circuit connected to a traction battery according to examples disclosed herein.

FIG. 5 shows an electrical power circuit 100 connected to a traction battery 106 to form a battery assembly 150 for a vehicle according to examples disclosed herein. The circuit 100 in this example is labelled as a Battery Electrical Module (BEM). Within the BEM 100 there is a Modular Electrical Electronic Architecture MEEA module 120 which houses, in this example, a first high voltage DCDC converter 112*a*, a second DCDC converter 112*b*, and an OBC 116.

The circuit 100 comprises a charging input 102 labelled "400V/800V HV DC Charger" for receiving electrical energy, which is connected to the DCDC converters 112*a*, 112*b*, to the OBC 116, and to the external battery pack 106 via the battery connection terminals 104*a* and 104*b*. The connection from the charging input 102 to the battery pack 106 is to supply electrical energy from the charging input 102 for charging the traction battery 106 at the first voltage V1 or the second voltage V2. The electrical energy may be received at a first voltage V1 (in this example, 800V) or a second voltage V2 (in this example, 400V) for charging the traction battery 106.

The battery connection terminals 104*a* and 104*b* electrically connect the traction battery 106 to the BEM 100. Battery connection terminal 104*a* electrically connects to the DCDC converters 112*a*, 112*b* and the OBC 116. The traction battery 106 can, via the battery connection terminal 104*b*, provide electrical energy to power one or more traction motors 108 of the vehicle at the second voltage (in this example, output at 400V to a HV DC Front Traction motor and a HV DC Rear Traction motor 108 are shown). For example, electrical energy from the charging input 102 may be supplied at 800V or 400V to charge the traction battery 106, and a traction motor 108 may be powered by the traction battery 106 at 400V. One DCDC converter 112*a* is shown as configured to convert either 800V or 400V input to 400V output (though other high voltage outputs may be provided in different examples). Another DCDC converter 112*b* is shown as configured to convert either 800V or 400V input to 12V output (though other low voltage outputs may be provided in different examples). Other examples may comprise one, three, or more than three DCDC converters.

The DCDC converters 112*a*, 112*b* are each coupled to the charging input 102 and to an output 110*a*, 110*b* (in this example, there are two outputs respectively connected to a corresponding DCDC converter 112*a*, 112*b*). The HV DCDC converter 112*a* is connected to a HV output 110*a* labelled in this example as "400V 15 kW Auxiliary Units" (the output 110*a* itself comprises two output channels, a first to a HV DC Heater and a second to a HC DC Chiller). The LV DCDC converter 112*b* is connected to a LV output 110*b* labelled in this example as "4 kW LV DCDC". The outputs 110*a*, 110*b* each respectively connect to an electrical bus of the vehicle for providing electrical power to electrical units of the vehicle at the indicated output voltages (two HV outputs 110*a* and one LV output 110*b* in this example). The DCDC converters 112*a*, 112*b* are each respectively configured to receive electrical energy from the charging input 102, and provide electrical energy at the output voltage(s) to the outputs 110*a*, 110*b*, whilst the traction battery 106 is charged at the first voltage. In this example, the first output 110*a* may provide an output at 400V, which may be the same voltage, 400V, as that provided at the input 102 in some cases.

The DCDC converters 112*a*, 112*b* in this example are also configured to receive electrical energy from an AC charging input 114 (labelled "HV AC Charger"), and provide electrical energy to the battery connection terminal 104 at the first voltage for charging the traction battery. The onboard charger 116 is coupled to the DCDC converters 112*a*, 112*b*. The onboard charger 116 is configured to receive AC current at the AC charging input terminal 114, and provide a DC current to the DCDC converters 112*a*, 112*b*. In this example, the OBC 116 is shown as configured to accept 800V or 400V input voltage. In this example, the AC charging input 114 forms an external connection, for example for connection to an AC charge supply, and is connected to the OBC 116 which receives AC input power and provides DC power to the DCDC converters 112*a*, 112*b*. Also shown in this example are service test points 124 configured to allow electrical access for connecting testing of the BEM. A purpose of service test points 124 is to enable safe and expedient disconnection of the battery pack 106 from the vehicle. Such test points 124 allow an operator to check that all connections to the battery 106 have been reduced to safe working voltages and are hence safe to disconnect.

The traction battery 106 in this example is shown electrically connected to the battery connection terminal 104*a*, 104*b*, and allows for connection of the battery pack 106 to the power circuit 100. The traction battery 106 in this example is comprises a first plurality of cells 122*a*, a second plurality of cells 122*b*, and a battery control circuit (not shown) to selectively interconnect the first and second plurality of cells 122*a*, 122*b* in series to provide a first battery voltage at the battery output 104*b* in a first mode of operation and to selectively interconnect the first and second plurality of cells 122*a*, 122*b* in parallel to provide a second battery voltage at the battery output 104*b* in a second mode of operation. In this example, the first and second plurality of cells 122*a*, 122*b* are each 400V cells, the first battery voltage may be 800V and the second battery voltage may be 400V.

Figure 6:
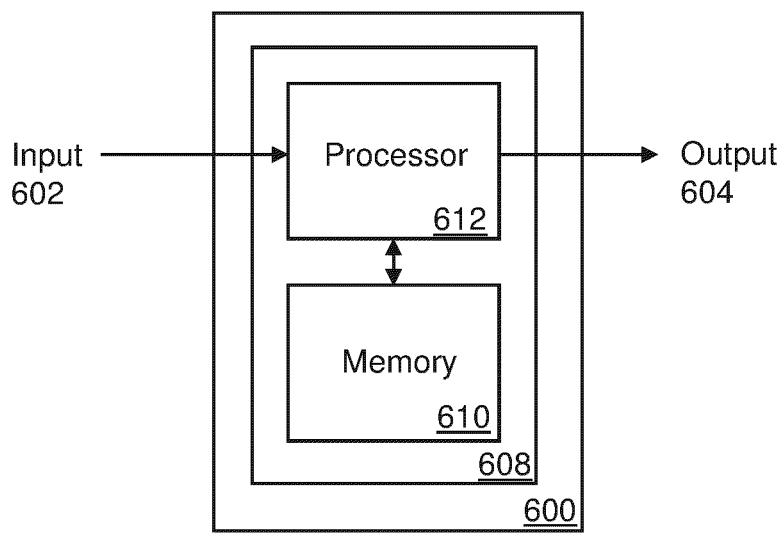
FIG. 6 shows a control system according to examples disclosed herein.

FIG. 6 shows a control system 600 for controlling an electrical power circuit of a vehicle such as those illustrated in FIGS. 1 to 5. The control system 600 comprises one or more controllers 608. The control system 600 is configured to control an electrical power circuit 100 comprising: a charging input 102 for receiving electrical energy at a voltage equal to a first voltage or a second voltage for charging a traction battery 106 of the vehicle; and a battery connection terminal 104 for electrically connecting to the traction battery 106 to supply electrical energy from the charging input 102 for charging the traction battery 106 at the first voltage or the second voltage and to receive electrical energy from the traction battery 106 to power one or more traction motors 108 of the vehicle at the second voltage; and a DCDC converter 112 coupled to the charging input 102 and to an output 110, the output 110 for electrically connecting the DCDC converter 112 to an electrical bus of the vehicle for providing electrical power to one or more electrical units of the vehicle at an output voltage.

The control system 600 is configured to control the DCDC converter 112 to receive electrical energy from the charging input 102, and provide electrical energy at the output voltage to the output 110 whilst the traction battery 106 is charged at the first voltage.

The one or more controllers 608 may collectively comprise at least one electronic processor 612 having an electrical input 602 for receiving information from one or more sensors and/or one or more external controllers; and at least one electronic memory device 610 connected to the at least one electronic processor 612 and having instructions stored therein. The at least one electronic processor 612 may be configured to access the at least one memory device 610 and execute the instructions thereon so as to cause the control system 600 to control the DCDC converter in dependence on the information. For example, an input may be provided to the input 602 indicating the DCDC converter is to receive electrical energy at a particular first voltage e.g. 800V. The controller may then provide an output signal at the output 604 for transmission to the DCDC converter to indicate electrical power at e.g. 400V is to be provided by the DCD converter and/or signalling to the DCDC converter to cause it to operate at 800V input voltage and provide electrical energy at 400V output voltage may be provided from the output 604.

In examples in which the power circuit 100 comprises an AC charging input 114, the control system 600 may be configured to control the DCDC converter 112 to receive electrical energy from the AC charging input 114 and provide electrical energy to the battery connection terminal 104 at the first voltage for charging the traction battery 106. For example, an input may be provided to the input 602 indicating the DCDC converter is to receive AC electrical energy at a particular first voltage e.g. 400V. The controller may then provide an output signal at the output 604 for transmission to the DCDC converter to indicate AC electrical power at 400V is to be provided and/or signalling to the DCDC converter to cause it to operate at 400V AC input voltage and provide electrical energy at 12V DC output voltage.

The controller(s) 600 may each comprise a control unit 608 or computational device having one or more electronic processors 612. A vehicle (see FIG. 8) and/or a system thereof (see FIG. 7) may comprise a single control unit 608 or electronic controller 600 or alternatively different functions of the controller(s) 600 may be embodied in, or hosted in, different control units 608 or controllers 600. A set of instructions could be provided which, when executed, cause said controller(s) 600 or control unit(s) 608 to implement the control techniques described herein (including the described method(s)). The set of instructions may be embedded in one or more electronic processors 612, or alternatively, the set of instructions could be provided as software to be executed by one or more electronic processor(s) 612. For example, a first controller 608 may be implemented in software run on one or more electronic processors 612, and one or more other controllers 608 may also be implemented in software run on one or more electronic processors 612, or, optionally, on the same one or more processors 612 as the first controller 608. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

Figure 7:
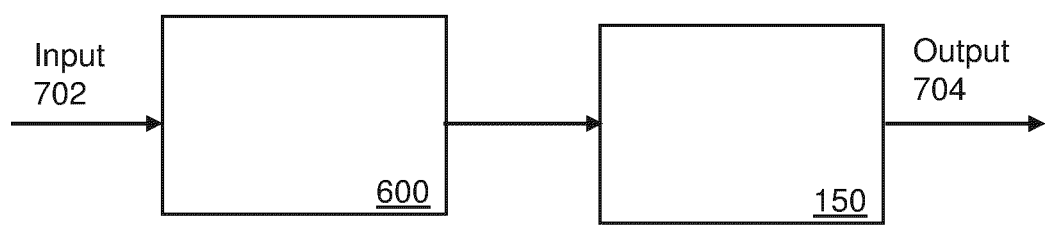
FIG. 7 shows a system according to examples disclosed herein.

FIG. 7 illustrates a system 700 comprising an input 702, a control system 600, for example as illustrated in FIG. 6, a battery assembly 150 as disclosed herein e.g. as illustrated in FIGS. 4 and 5, and controlled by the control system 600, and an output 704.

Figure 8:
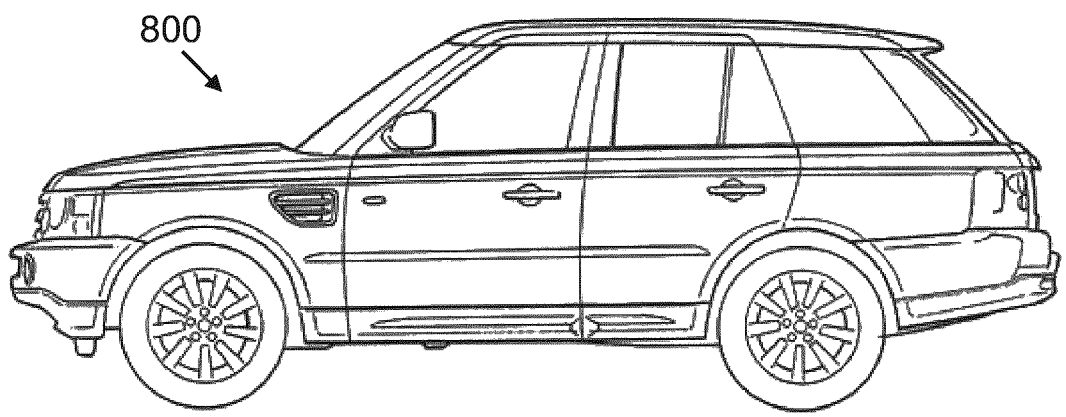
FIG. 8 shows a vehicle according to examples disclosed herein.

FIG. 8 shows a vehicle 800 comprising an electrical power circuit 100 as described above, a battery assembly 150 as described above, a control system 600 as described above, or a system 700 as described above. The vehicle may comprise an electrical bus, wherein the electrical bus comprises an auxiliary power bus (e.g. a High Voltage (HV) bus) configured to provide electrical energy to one or more auxiliary units of the vehicle 800 at the second voltage provided by the electrical power circuit. The example vehicle 800 may be a passenger vehicle, also referred to as a passenger car or as an automobile, or in other examples, the vehicle 800 may be an industrial vehicle. The vehicle 800 may be an electric vehicle (EV) or a hybrid electric vehicle (HEV). If the vehicle 800 is an HEV, the vehicle 800 may be a plug-in HEV or a mild HEV. If the vehicle 800 is a plug-in HEV, the vehicle 800 may be a series HEV or a parallel HEV. In a parallel HEV, a traction motor and an internal combustion engine are operable in parallel to simultaneously provide tractive torque. In a series HEV, the internal combustion engine generates electricity and the traction motor exclusively provides tractive torque.

FIG. 9 show a method 900 of controlling an electrical power circuit for a vehicle as disclosed herein. The method 900 comprises controlling the DCDC converter to: receive electrical energy from the charging input 902; and provide electrical energy at the output voltage to the output whilst the traction battery is charged at the first voltage 904.

The blocks illustrated in FIG. 9 may represent steps in a method 900 and/or sections of code in a computer program configured to control an electrical power circuit as described above to perform the method steps. The illustration of a particular order to the blocks does not necessarily imply that there is a required or preferred order for the blocks and the order and arrangement of the block may be varied. Furthermore, it may be possible for some steps to be omitted or added in other examples. Therefore, this disclosure also includes computer software that, when executed, is configured to perform any method disclosed herein, such as that illustrated in FIG. 9. Optionally the computer software is stored on a computer readable medium, and may be tangibly stored.

Examples disclosed herein allow for the changing of a battery pack of a vehicle at a first voltage of a plurality of possible voltages, while electrical power is provided to one or more auxiliary units of the vehicle at one or more further voltages—which may or may not match the charging voltage at the input. For example, a battery pack may be charged at 800V while power is provided to a battery heater unit at 400V, and/or power is supplied to a vehicle auxiliary unit at 12V. Further, examples disclosed herein may allow for port voltages to be configured in multiple ways, which may be desirable for use in multiple vehicles/vehicle configurations. These different voltage requirements for different vehicles may be described as "cross-car requirements". Further, the configuration of the circuits described herein may be adapted by the user 'on the fly'. For example, the vehicle battery may be charged using 800V or 400V chargers without any requirement to update the hardware in the vehicle by use of the switching means allowing acceptable of 400V or 800V at the circuit input. This cannot be done with the existing topology.

It will be appreciated that various changes and modifications can be made to the examples disclosed herein without departing from the scope of the present application as defined by the appended claims.

As used here 'module' refers to a unit or apparatus that excludes certain parts/components that would be added by an end manufacturer or a user.

As used here, 'connected' means 'electrically interconnected' either directly or indirectly. Electrical interconnection does not have to be galvanic. Where the control system is concerned, connected means operably coupled to the extent that messages are transmitted and received via the appropriate communication means.

The term 'current' means electrical current. The term 'voltage' means potential difference. The term 'series' means electrical series. The term 'parallel' means electrical parallel. The term 'power' means electrical power. The term 'charging' means electrical recharging of the battery.

The term "winding" is synonymous with "coil" in terms of the transformer windings and split windings. In examples in which one of the split windings is connected in the circuit, for example to accept/provide a lower voltage than if both of two split windings are connected in the circuit in series, it may be understood that the other(s) split winding(s) are not connected in the circuit, i.e. they are left "floating".

Although examples have been described in the preceding paragraphs with reference to various examples, it should be appreciated that modifications to the examples given can be made without departing from the scope of the invention as set out in the appended claims. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

Whilst endeavouring in the foregoing specification to draw attention to those features believed to be of particular importance it should be understood that the Applicant claims protection in respect of any patentable feature or combination of features hereinbefore referred to and/or shown in the drawings whether or not particular emphasis has been placed thereon.

The invention claimed is:

1. An electrical power circuit for a vehicle, comprising:
    a charging input for receiving electrical energy at a voltage equal to a first voltage or a second voltage for charging a traction battery of the vehicle;
    a battery connection terminal for electrically connecting to the traction battery to supply electrical energy from the charging input for charging the traction battery at the first voltage or the second voltage and to receive electrical energy from the traction battery to power one or more traction motors of the vehicle at the second voltage; and
    a DCDC converter coupled to the charging input and to an output, wherein the output is for electrically connecting the DCDC converter to an electrical bus of the vehicle for providing electrical power to one or more electrical units of the vehicle at an output voltage, and wherein the DCDC converter is configured to receive electrical energy from the charging input, and to provide a stable output of electrical energy at the output voltage to the output regardless of whether the traction battery is being charged at the first voltage or the second voltage such that the one or more electrical units may operate at their preferred voltage regardless of whether the traction battery is presently being charged at the first voltage or the second voltage.

2. The electrical power circuit of claim 1, wherein the first voltage is higher than the second voltage.

3. The electrical power circuit of claim 1, wherein the first voltage is a voltage within a first voltage range and the second voltage is a voltage within a second voltage range, and wherein the first voltage range and the second voltage range are non-overlapping ranges.

4. The electrical power circuit of claim 1, wherein the output voltage is lower than the first voltage and the second voltage.

5. The electrical power circuit of claim 1, wherein the output voltage is the second voltage.

6. The electrical power circuit of claim 1, comprising an AC charging input, wherein the DCDC converter is configured to receive electrical energy from the AC charging input and provide electrical energy to the battery connection terminal at the first voltage for charging the traction battery.

7. The electrical power circuit of claim 1, comprising an onboard charger coupled to the DCDC converter, the onboard charger configured to receive AC current and to provide a DC current to the DCDC converter.

8. A battery assembly comprising a traction battery and the electrical power circuit of claim 1, wherein the traction battery comprises a battery input/output, and wherein the battery input/output is electrically connected to the battery connection terminal.

9. A vehicle comprising the electrical power circuit of claim 1.

10. A control system for controlling an electrical power circuit of a vehicle, the control system comprising one or more controllers, wherein the control system is configured to, in an electrical power circuit comprising:
    a charging input for receiving electrical energy at a voltage equal to a first voltage or a second voltage for charging a traction battery of the vehicle;
    a battery connection terminal for electrically connecting to the traction battery to supply electrical energy from the charging input for charging the traction battery at the first voltage or the second voltage and to receive electrical energy from the traction battery to power one or more traction motors of the vehicle at the second voltage; and
    a DCDC converter coupled to the charging input and to an output, the output for electrically connecting the DCDC converter to an electrical bus of the vehicle for providing electrical power to one or more electrical units of the vehicle at an output voltage;
    control the DCDC converter, to:
    receive electrical energy from the charging input, and provide a stable output of electrical energy at the output voltage to the output regardless of whether the traction battery is being charged at the first voltage or the second voltage such that the one or more electrical units may operate at their preferred voltage regardless of whether the traction battery is presently being charged at the first voltage or the second voltage.

11. A system comprising:
    a battery assembly comprising a traction battery and an electrical power circuit;
    wherein the electrical power circuit comprises:
        a charging input for receiving electrical energy at a voltage equal to a first voltage or a second voltage for charging a traction battery of the vehicle;
        a battery connection terminal for electrically connecting to the traction battery to supply electrical energy from the charging input for charging the traction battery at the first voltage or the second voltage and to receive electrical energy from the traction battery to power one or more traction motors of the vehicle at the second voltage; and
        a DCDC converter coupled to the charging input and to an output, the output for electrically connecting the DCDC converter to an electrical bus of the vehicle for providing electrical power to one or more electrical units of the vehicle at an output voltage, the DCDC converter configured to receive electrical energy from the charging input, and to provide electrical energy at the output voltage to the output whilst the traction battery is charged at the first voltage;

wherein the traction battery comprises a battery input/output, and wherein the battery input/output is electrically connected to the battery connection terminal; and the control system of claim 10.

12. A method of controlling an electrical power circuit for a vehicle, the electrical power circuit comprising:

a charging input for receiving electrical energy at a voltage equal to a first voltage or a second voltage for charging a traction battery of the vehicle; and a battery connection terminal for electrically connecting to the traction battery to supply electrical energy from the charging input for charging the traction battery at the first voltage or the second voltage and to receive electrical energy from the traction battery to power one or more traction motors of the vehicle at the second voltage; and a DCDC converter coupled to the charging input and to an output, the output for electrically connecting the DCDC converter to an electrical bus of the vehicle for providing electrical power to one or more electrical units of the vehicle at an output voltage;

the method comprising controlling the DCDC converter to:

receive electrical energy from the charging input; and provide a stable output of electrical energy at the output voltage to the output regardless of whether the traction battery is being charged at the first voltage or the second voltage such that the one or more electrical units may operate at their preferred voltage regardless of whether the traction battery is presently being charged at the first voltage or the second voltage.

13. A non-transitory computer-readable medium having stored thereon computer software that, when executed, is configured to perform the method according to claim 12.

14. The battery assembly of claim 8, wherein the traction battery comprises a first plurality of cells, a second plurality of cells, and a battery control circuit to selectively interconnect the first and second plurality of cells in series to provide a first battery voltage at the battery output in a first mode of operation and to selectively interconnect the first and second plurality of cells in parallel to provide a second battery voltage at the battery output in a second mode of operation.

15. A vehicle comprising the battery assembly of claim 8.

16. A vehicle comprising the control system of claim 10.

17. A vehicle comprising the system of claim 11.

18. The electrical power circuit of claim 6, wherein the output is for electrically connecting the DCDC converter to an electrical bus of the vehicle for providing electrical power to one or more auxiliary electrical units of the vehicle at the output voltage whilst the traction battery is being charged by AC charging.

* * * * *